June 23, 1931.   J. W. BOOTHMAN   1,811,111
WINDOW SCREEN AND FRAME CONSTRUCTION
Filed May 27, 1930   3 Sheets-Sheet 1

Inventor
James W. Boothman

By Clarence A. O'Brien
Attorney

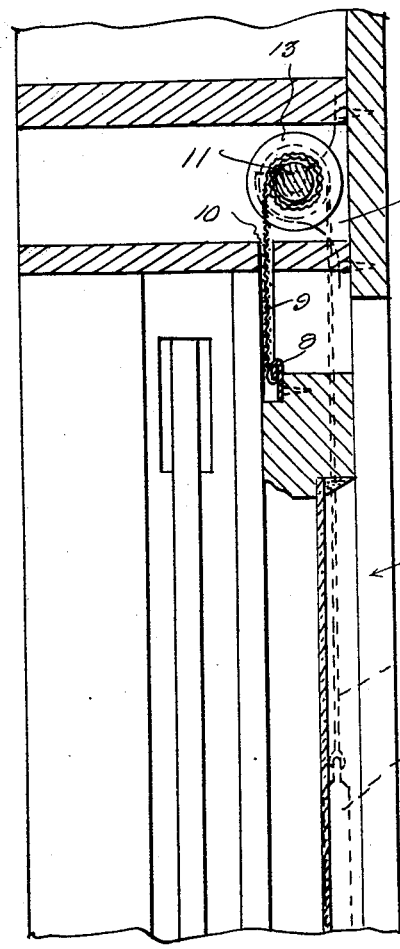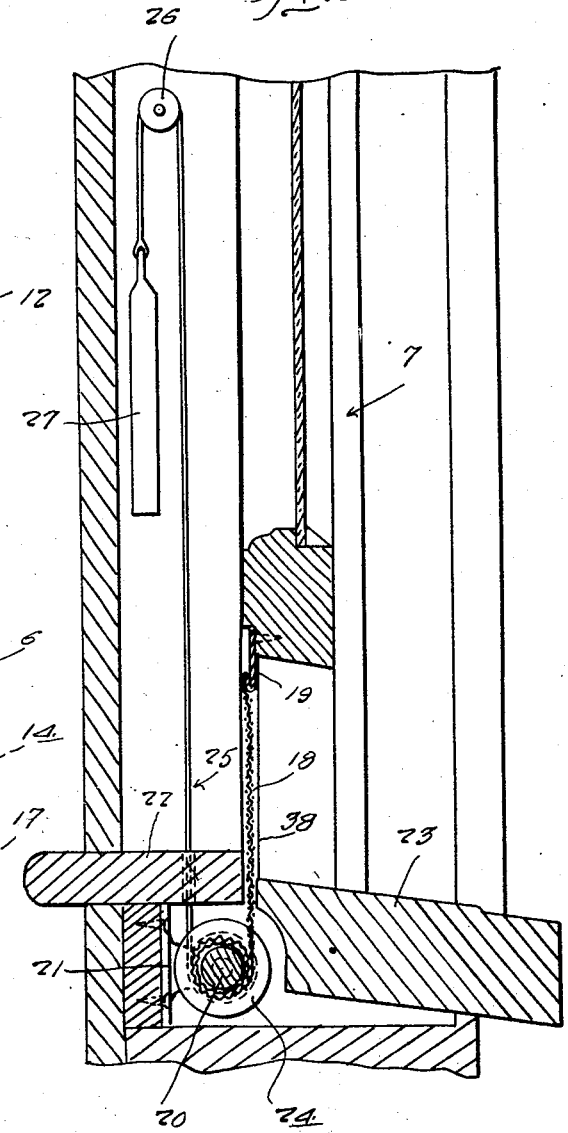

June 23, 1931.  J. W. BOOTHMAN  1,811,111
WINDOW SCREEN AND FRAME CONSTRUCTION
Filed May 27, 1930   3 Sheets-Sheet 3

Inventor
James W. Boothman
By *Clarence A. O'Brien*
Attorney

Patented June 23, 1931

1,811,111

UNITED STATES PATENT OFFICE

JAMES W. BOOTHMAN, OF PROVIDENCE, RHODE ISLAND

WINDOW SCREEN AND FRAME CONSTRUCTION

Application filed May 27, 1930. Serial No. 456,129.

This invention relates to an improved window screen and frame structure, and it has more particular reference in one instance to a form of screen which is permanently mounted in the especially designed window frame and connected with the companion sashes in a manner to screen the window opening both at the bottom and top.

Briefly stated, certain novelty is predicated upon upper and lower screens connected with the respective upper and lower sashes, each screen having a complemental roller on which it is wound, together with a counter-weight so arranged as to permit the individual screens to operate in unison with the companion sashes in each instance.

Additional novelty is predicated upon the especially constructed window frame whose details are constructed and mechanically co-related in a manner to insure more effective cooperation with the screen, as well as to provide practicable weather-proof joints between the companion details.

A further feature of the invention is predicated upon the provision in the vertical side members of the frame of grooves constituting runways for slidably receiving and accommodating flexible binders disposed along the marginal edge portions of the screens so as to provide fly stops and to protect the edges of the screen against spraying out.

A further feature of the invention is predicated upon the provision of a combined weather-strip and fly stop for use in association with the complemental rails of the upper and lower sashes.

In carrying the invention into practice, I have developed what I believe to be a practicable, simple, and economical contribution to the art which is readily and distinguishably different from prior art screen structures with which I am familiar.

Other features and advantages will become more readily apparent from the following description and drawings.

In the drawings:—

Fig. 2 is a sectional view of the upper portion of the structure showing the upper screen arrangement.

Fig. 3 is a similar view of the lower portion of the structure showing the lower screen arrangement and construction.

Figures 1, 4:
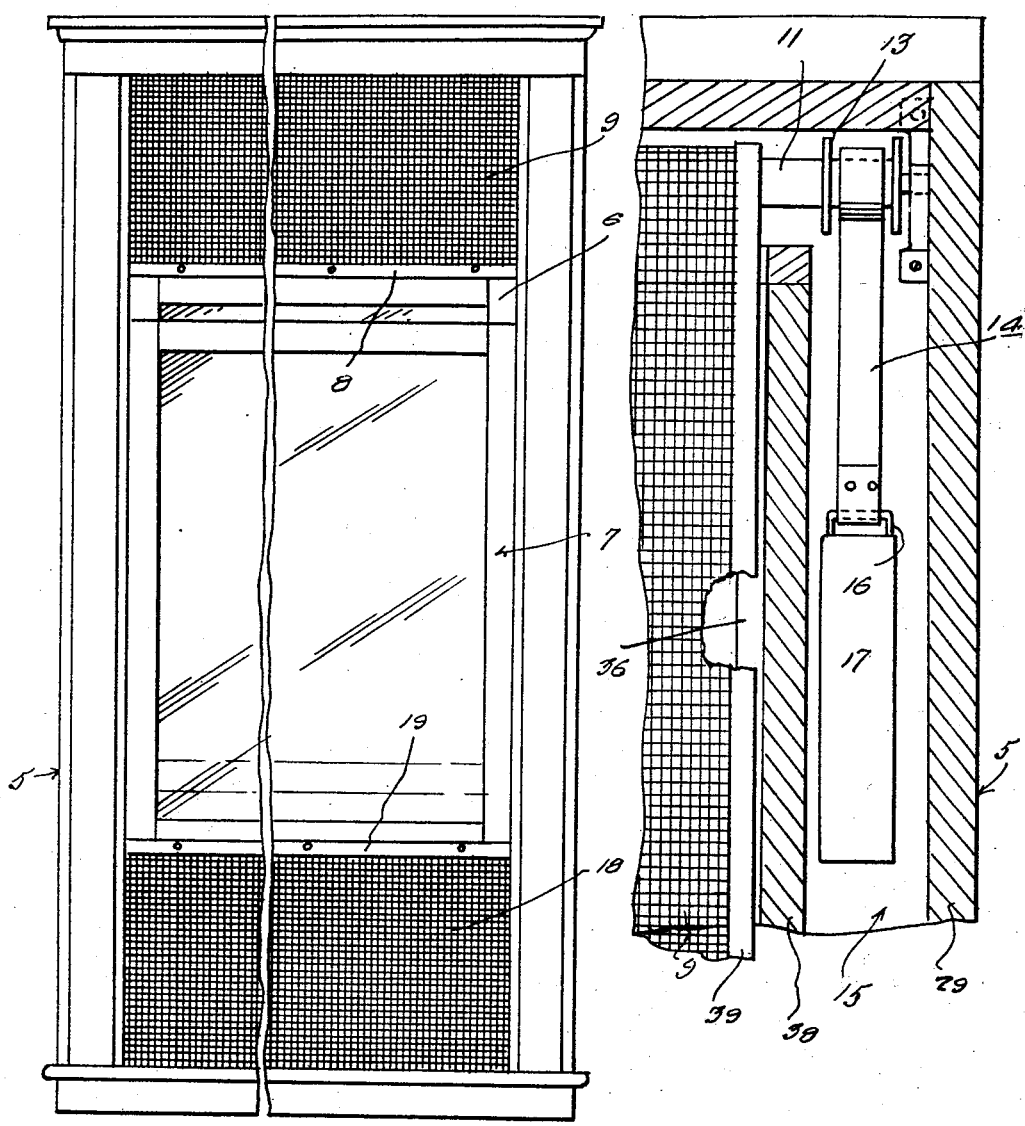
Figure 1 is a fragmentary front view showing the revised and improved window frame, the upper and lower complemental sliding sashes, and the improved screens associated therewith in accordance with the present invention.
Fig. 4 is an end elevational view of the upper screen roller and the counter-balancing weight.

In the drawings in Fig. 1, the reference character 5 designates generally the window frame which is of special design and construction. The upper sliding sash is indicated at 6 and the lower sash at 7. These are also of customary construction.

In accordance with the present invention, the upper rail of the upper sash 6 in Fig. 2 is rabbeted to accommodate a metal cleat or retaining strip 8. One end of the companion screen 9 is fastened thereto, and the screen extends upwardly through a slot 10 in the header construction of the framework where it is wound around a roller 11. The roller is journalled for rotation in appropriate supporting brackets 12 confined and concealed within the frame structure.

As shown in Fig. 4, the numerals 13 designate a pair of flanges on the right hand end of the roller which defines a winding drum for the flexible suspension strap 14 and this strap extends down into the vertical boxing or weight pocket 15 thereunderneath, where it is attached to the hanger bracket 16 on the return weight 17.

It is obvious that when the sash 6 is pulled down from the top it pulls the screen 9 down through the slot 10 to cover the otherwise exposed opening. When the sash is slid back up, the weight 17 causes the tape or strap 14 to unwind from the drums 14. As the tape unwinds, the screen 9 is wound on its roller 10.

The lower screen is of a reverse arrangement. This lower screen is designated by the numeral 18 and it is bound to an attaching strip 19 carried by the lower frame bar of the lower sash 7 as seen plainly in Fig. 3. This screen 18 is wound around the roller or shaft 20. This shaft is mounted in breaking brackets 21 and is located in a suitably shaped housing which is formed in the base portion of the window frame construction as seen in Fig. 3. The screen is movable between the spaced edges of the sections 22 and 23 of the sill construction.

This roller 20 is also provided at one end with a flanged drum 24 accommodating the tape 25 which is here shown as passing over a pulley 26 connected with the hanging weight 27.

Due to the fact that the tape 25 extends upwardly in this instance, it is obvious that the free end portion must be carried over the pulley 26 to permit the weight 27 to be suspended in any desired active manner. Thus, as the sash 7 is raised upwardly, the screen 18 will unwind from the roller 20. At the same time, the tape 25 will wrap around the drum 24. When the sash 7 is again lowered, it is obvious that the action of the weight 27 will be to wind the screen on the roller 20 and to unwind the tape 25 as the weight is lowered.

The gist of the invention as far described, is in the provision of the independent fabric screens attached to the companion sashes and each screen being wound on an independent shaft or roller, together with the duplex arrangement of tapes and weights wherein the weights in both instances hang down in such a manner as to produce the reverse winding of the screen on its roller and unwinding of the tape. This permits the screen to pay out as the sash is moved to an open position, thus causing it to automatically cover the window opening. In this way, the screens are substantially automatic in operation and are constantly in position for screening the upper and lower portions of the window opening according to the movement of the respective sashes.

Figure 6:
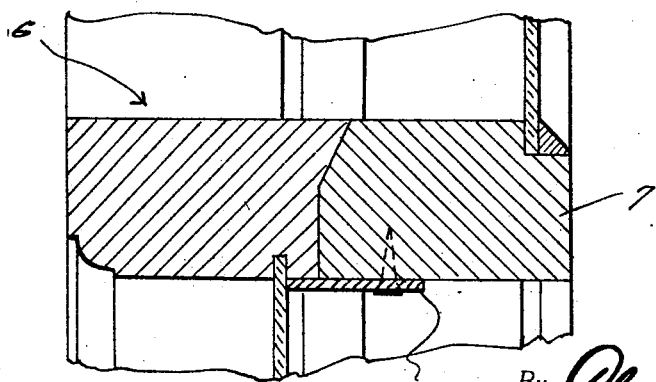
Figure 6 is a cross section through the heating or complemental rails of the window sashes showing the weather strip.

At this time, I invite attention to Fig. 6 wherein it will be observed that the numeral 28 designates a combined weather and fly stop in the nature of a strip fastened to the lower rail of the upper sash 7 and bridging the space between it and the complemental rail of the lower sash 6.

Figure 5:
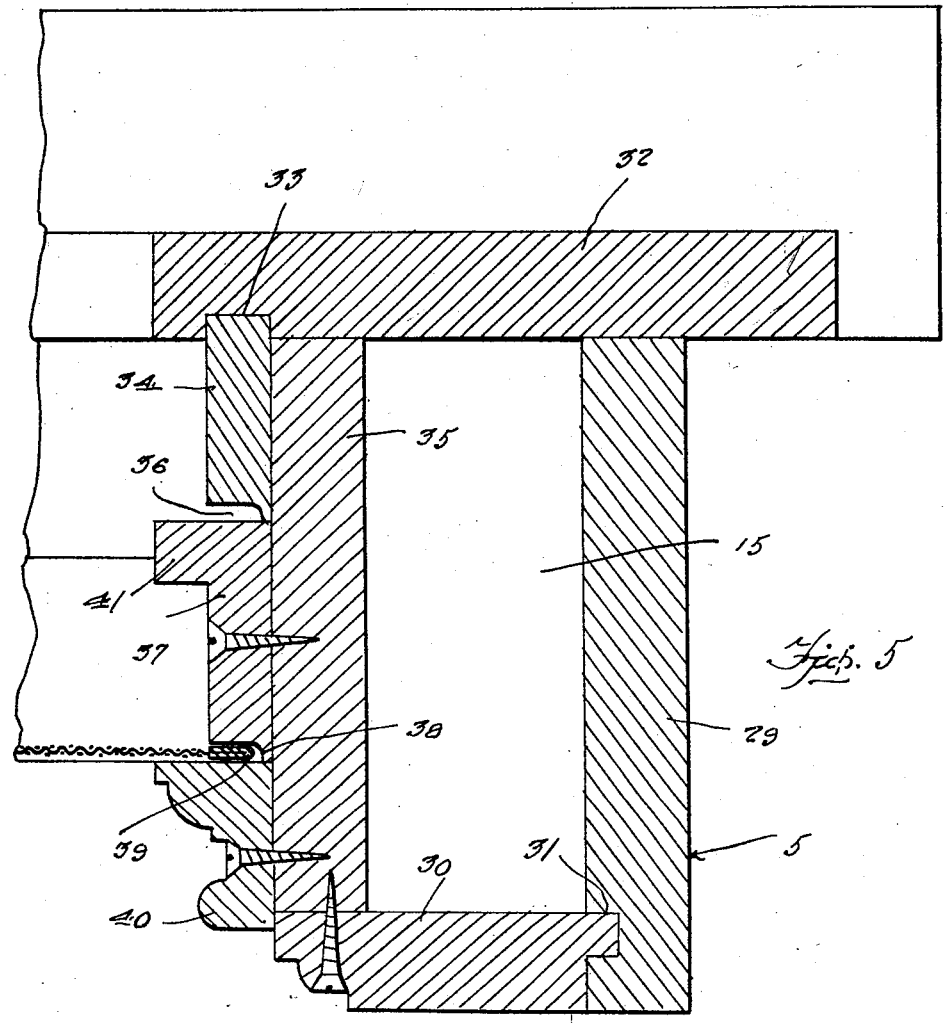
Fig. 5 is an enlarged fragmentary horizontal sectional view through one of the vertical members of the refined and especially designed window frames.

As before stated, the novelty is predicated upon the construction of the window frame in a manner to accommodate the roller screen and particular emphasis is placed upon the mechanical developments of the vertical members of the frame, one of which is shown in Fig. 5 of the drawings.

Referring to this figure, it will be noted that the aforesaid pocket 15 is applied by an outside cover board at 29 having a vertical rabbet formed along one edge to provide a mortise for reception of a tenon rib on the inside facing 30. This provides a tongue and groove joint at 31 making a weather-proof connection.

The outer edge of the board 29 bears against the outer facing 32. This facing is formed with a groove as at 53 to accommodate the adjacent edge portions of the insert 34. This provides for weather-tight joints at this point for cooperation with the adjacent pulley stile 35. This insert 34 is provided with a vertical groove constituting a screen runway 36.

The numeral 37 designates the parting strip which is fastened to the stiles 35 and formed in its inner edge with a groove 38 constituting a guide or runway for the complemental screens.

In this connection, it will be observed that the vertical or marginal edges of the screens are formed with flexible reinforcing binders 39 which break in the respective runways 36 and 38. The numeral 40 designates a molding whose dimensions are such as to cover and complete the formation of the runway 38. Likewise, it will be observed that the lateral extension 41 of the parting strip cooperates with the groove 36 in forming a similar closed channel-way for the screen binder.

Particular emphasis is laid upon the sectional construction of the vertical members of the window frame construction, and especially the provision of the parts 34 and 37 having a respective groove 36 and 38 to accommodate the edge bindings on the complemental screens.

Although the screen arrangement constituting a primary factor of this invention has been shown and described as applicable to a window construction, it is understood that the inventive conception comprehends the incorporation of the same principal and general arrangement of parts and other forms of closures such as for instance, in doors and the like where the screen moves vertically or horizontally.

It is thought that persons skilled in the art to which the invention relates will be able to obtain a clear understanding of the invention, after considering the description in connection with the drawings. Therefore, a more lengthy description is regarded as unnecessary.

Minor changes in shape, size, and re-arrangement of details coming with the field of invention claimed, may be resorted to in actual practice if desired.

Having thus described my invention, what I claim as new is:—

1. In a window frame construction for sliding sashes comprising vertical side pieces for the respective upper and lower sashes, each of said sashes having a screen secured to one end thereof with the side edges of a screen extending beyond the side limits of the sash; guides for the side edges of the screen, each guide being formed by spacing the adjacent vertical edges of the vertical side pieces, one of said vertical side pieces having an outstanding parting strip projected therefrom adjacent one of the guides.

2. In a window frame construction with sliding sash comprising vertical side pieces for the sash, said sash having a screen secured to one end thereof with the side edges of the screen extending beyond the side edges of the sash, guides for the side edges of the screen, each guide being formed by spacing the adjacent vertical edges of the vertical side pieces.

In testimony whereof I affix my signature.

JAMES W. BOOTHMAN.